Dec. 19, 1933.  F. J. BECHERT  1,939,644
CHUCK
Filed March 10, 1931
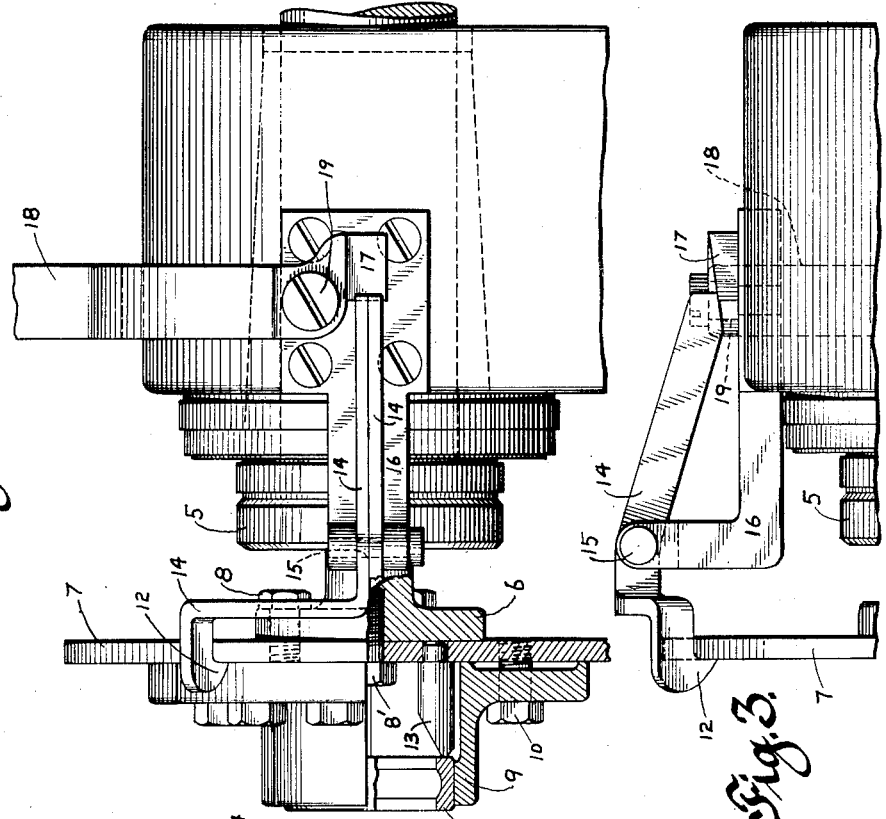
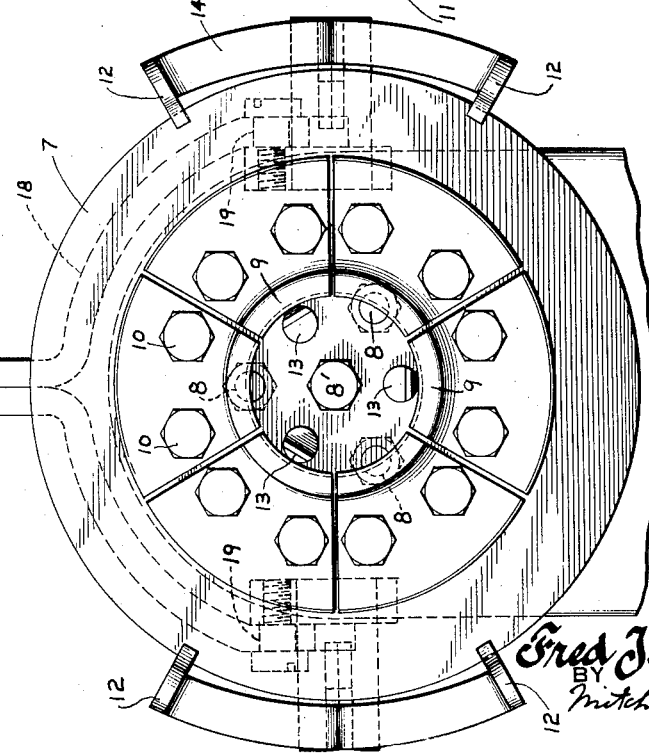
INVENTOR
Fred J. Bechert
BY
Mitchell & Bechert
ATTORNEY Patented Dec. 19, 1933

1,939,644

UNITED STATES PATENT OFFICE 1,939,644

CHUCK

Fred J. Bechert, Stamford, Conn., assignor to The Fafnir Bearing Company, New Britain, Conn., a corporation of Connecticut Application March 10, 1931. Serial No. 521,465

10 Claims. (Cl. 279—46)

My invention relates to a diaphragm chuck, and more particularly to certain improvements in a chuck of the type disclosed in Scaife Patent No. 1,389,272, dated August 30, 1921.

Said Scaife patent is subject to the disadvantage that the work stops are carried by a movable part of the diaphragm so that they are moved whenever the diaphragm is flexed in the course of chucking and unchucking operations. Thus, in gripping objects of different sizes, such objects, being in contact with the work stops, will not always be in the same position for the action of the tool.

It is the principal object of my invention to provide a diaphragm chuck so arranged that work pieces can be held in predetermined position for the action of the cutting, abrading, or polishing tool, regardless of variations in the size of such work pieces.

It is a further object of my invention to provide a diaphragm chuck in which the rotating parts are of less weight than the rotating parts of the diaphragm chucks which are now employed for the same class of work, thus enabling the machine to which the chuck is attached to be stopped and started more quickly when work pieces are changed. Other objects and features of invention will hereinafter appear.

These objects are accomplished by providing a diaphragm chuck in which the flexing force is applied near the periphery of the diaphragm, and by securing the central portion of the diaphragm which carries the work stops for positioning the work so that it will not be influenced by the flexing of the remainder of the diaphragm.

In the drawing which shows, for illustrative purposes only, a preferred form of the invention—

Fig. 1 is a front view in elevation of a chuck illustrating features of the invention;

Fig. 2 is a side view in quarter section of the chuck shown in Fig. 1, a work piece being shown in position in the chuck;

Fig. 3 is a fragmentary bottom view of part of the device shown in Fig. 1 and Fig. 2.

In said drawing, 5 indicates a spindle or other support for the face-plate portion 6, which alone or in connection with the spindle constitutes what may be termed a support or the body of the chuck. A diaphragm 7 is secured to the chuck body, preferably at the central portion of the diaphragm. In the form shown, a series of cap screws 8—8 extend through the face-plate 6 and are threaded into the diaphragm 7, and a cap screw 8' extends through the diaphragm 7 and is threaded into the face-plate 6. The diaphragm carries chuck jaws 9—9 which, as shown, may be separate members attached to the diaphragm, as by cap screws 10—10. The jaws herein disclosed are shaped for gripping a ball bearing ring 11.

For the particular chuck arrangement shown, the diaphragm is arranged to be flexed by means of a series of hooks 12—12, which engage the peripheral portion of the diaphragm and which are actuated in any suitable manner. It will be seen that upon movement of the hooks 12—12 to the right in Fig. 2, the diaphragm 7 will be flexed and the chuck jaws 9—9 will be moved radially outward. Thereafter, upon moving the hooks 12—12 to the left, the diaphragm 7 will spring back to its normal position of equilibrium, and in so doing will cause the jaws 9—9 to grip the work piece, such as the bearing ring 11.

In order to definitely locate the work piece 11 longitudinally, I provide work stop means carried by the diaphragm and extending into proper position to act as locating stops for such work piece. My work stops in the form shown are the members 13—13 which are secured to the diaphragm 7 substantially at the portion thereof which is secured to the face-plate 6. At such location the work stops 13—13 will be moved to the minimum extent, or not at all, by the flexing of the diaphragm.

By my arrangement work stops appropriate to the chuck jaws carried by a particular diaphragm are carried by the same diaphragm, so that if it is desired to substitute a different diaphragm having different chuck jaws, the appropriate work stops will be present and adjusted. This advantage cannot be attained where the work stops are independent of the diaphragm, as when they are secured directly to the chuck body and project through apertures in the diaphragm. The use of apertures in the diaphragm is subject to the further disadvantage that small fragments of metal are liable to pass into the apertures and interfere with the free functioning of the diaphragm.

In the form shown, the hooks 12—12 are formed at one end of bell crank levers 14—14 which are pivoted, as at 15, to a fixed part 16 of the machine. The opposite ends of the bell crank levers 14—14 are engaged by cams 17—17 on the lower ends of levers 18—18 which are pivoted to fixed parts of the machine at 19—19. The hooks 12—12 may therefore be actuated by means of the levers 18—18 which may be connected to each other by any appropriate means.

In the drawing forming part of this application I have shown a diaphragm chuck which is adapted for internal grinding operations and which is positively actuated to release the work piece, the actual gripping of the work piece being performed by the jaws 9 springing back to their normal position which happens when the diaphragm 7 is unsprung by releasing the pull on the hooks 12. It should be understood, however, that my invention is equally applicable to a diaphragm chuck for external grinding operations and also to diaphragm chucks in which the jaws are positively operated to grip the work. For instance, if it is desired to apply my invention to a diaphragm chuck for external grinding, and which is positively actuated to release the work piece, the hooks 12—12 would be replaced by means adapted to push the peripheral portion of the diaphragm 7 towards the left in Fig. 2.

In my invention the face-plate 6 is made only of sufficient size to adequately support the central portion of the diaphragm 7. Considerable weight is therefore saved as compared to those types of diaphragm chucks in which the face-plate is made large enough to support the diaphragm near its periphery. This saving of weight facilitates starting and stopping of the machine because of the lessened inertia of the rotating parts.

It will thus be seen that I have provided an exceedingly simple arrangement having the advantages over other similar chucks as hereinabove indicated.

While a preferred form of the invention has been described in detail, it is to be understood that various changes and modifications may be made within the scope of the invention as defined in the appended claims.

I claim:

1. In a diaphragm chuck, a support, a diaphragm secured to said support, said diaphragm having a greater radial extension than said support, chuck jaws carried by said diaphragm, and means for flexing that part of said diaphragm outside of said support to move said jaws.

2. In a diaphragm chuck, a support, a diaphragm, means for securing the central portion of said diaphragm to said support, chuck jaws carried by said diaphragm on a flexible portion away from said support, means for flexing said diaphragm to move said jaws, and work stop means adjacent to said jaws for positioning the work.

3. In a diaphragm chuck, a chuck body, a diaphragm secured at its central portion to said body, chuck jaws carried by said diaphragm, means engaging the peripheral portion of said diaphragm for flexing said diaphragm to move said chuck jaws, and work stop means secured to the central portion of said diaphragm.

4. In a diaphragm chuck, a chuck body, a diaphragm, chuck jaws carried by said diaphragm, means for flexing said diaphragm for moving said jaws, a circularly arranged series of holding members for rigidly securing the central portion of said diaphragm to said chuck body, and work stop means secured to said diaphragm within the circle passing through said holding members.

5. In a diaphragm chuck, a chuck body, a diaphragm secured at its central portion to said body, chuck jaws carried by said diaphragm, work stop means secured to the central portion of said diaphragm, and hook means engaging the peripheral portion of said diaphragm for flexing said diaphragm to move said chuck jaws.

6. In a diaphragm chuck, a support, a diaphragm secured thereto at a zone inwardly of the edge of the diaphragm, chuck jaws on said diaphragm outwardly beyond the zone where the diaphragm is secured to said support, and means for flexing said diaphragm to move said jaws.

7. In a diaphragm chuck, a support, a diaphragm, means for securing an inner portion of said diaphragm to said support, chuck jaws carried by an outer portion of said diaphragm, and means for moving one portion of said diaphragm relatively to the other portion to flex the same and move said jaws.

8. In a diaphragm chuck, a stationary support, a diaphragm secured at its central zone to said support, chuck jaws carried by a portion of said diaphragm laterally of said zone of said support, and means for moving that portion of said diaphragm outside of said zone to move said jaws.

9. In a diaphragm chuck, a support, a diaphragm secured to said support, the periphery of said diaphragm being free and flexible relatively to said support, chuck jaws carried by the flexible portion of said diaphragm, and movable means for flexing said flexible portion of said diaphragm to move said jaws.

10. In a diaphragm chuck, a support, a diaphragm secured inside its periphery to said support, chuck jaws carried by the peripheral portion of said diaphragm, means coacting with the peripheral portion of said diaphragm for flexing the same to move said chuck jaws, and work stop means to aid in positioning the work in said jaws.

FRED J. BECHERT.